UNITED STATES PATENT OFFICE.

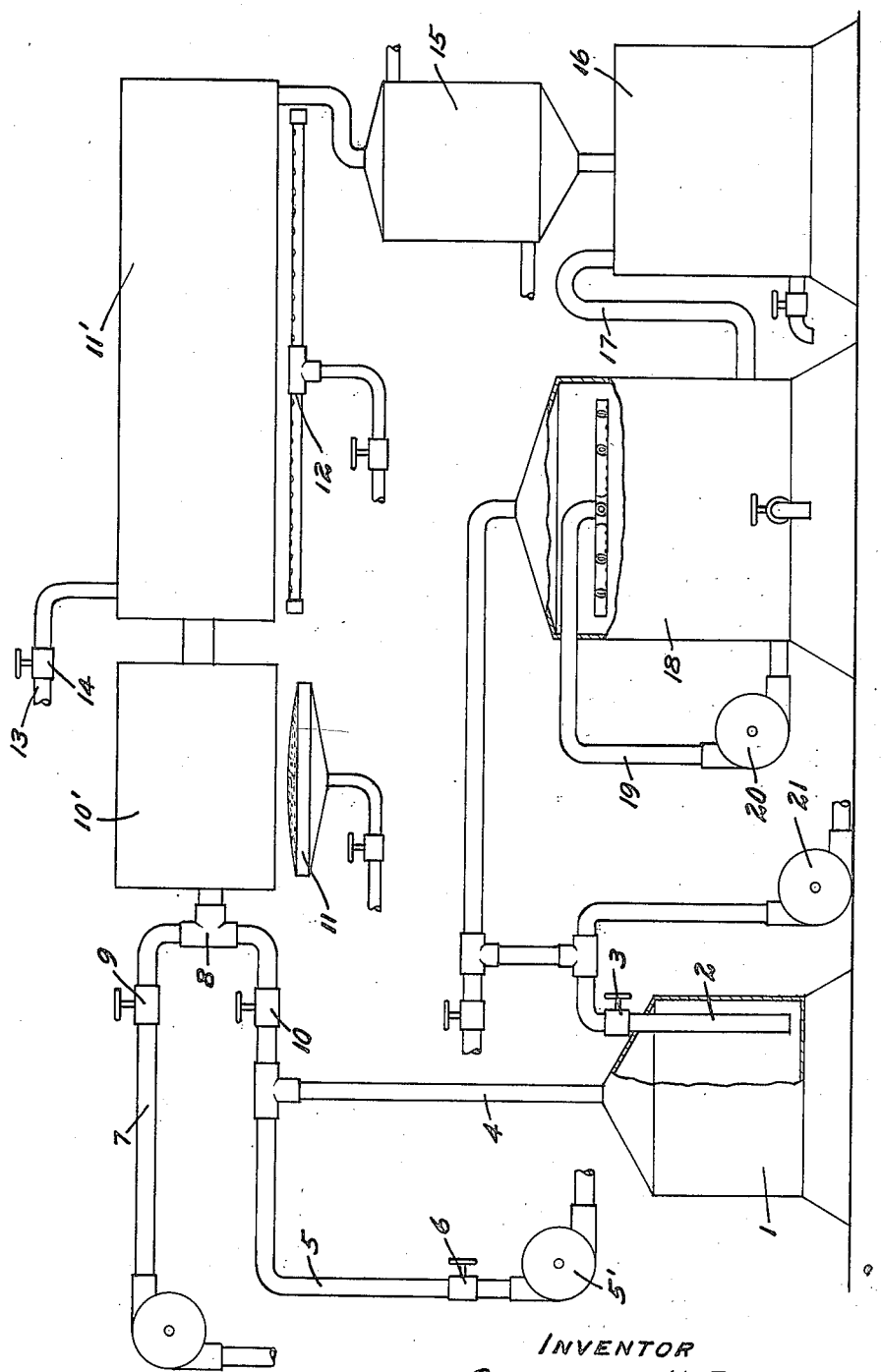

CARLISLE H. BIBB, OF PASADENA, CALIFORNIA, ASSIGNOR OF ONE-HALF TO JOHN T. BIBB, SR., OF PASADENA, CALIFORNIA.

PROCESS OF MAKING ALDEHYDES AND OTHER OXIDATION PRODUCTS.

1,392,886.   Specification of Letters Patent.   Patented Oct. 4, 1921.

Application filed October 27, 1919. Serial No. 333,633.

*To all whom it may concern:*

Be it known that I, CARLISLE H. BIBB, a citizen of the United States, residing at Pasadena, in the county of Los Angeles and State of California, have invented new and useful Improvements in Processes of Making Aldehydes and other Oxidation Products, of which the following is a specification.

My invention relates to a process of producing aldehydes and other oxidation products from hydrocarbons.

It is an object of this invention to provide a highly efficient, inexpensive and rapid process of making alcohol aldehydes and higher oxidation products from hydrocarbons by mixing the same with air or oxygen and passing the same, mixed with a gaseous catalyzer, through a heated reaction chamber, the catalyzing agent being of a nature that it can be readily regenerated and used in a continuous cycle of the process.

My invention consists in the steps of the process herein described and claimed.

In the accompanying drawing which forms a part of this specification I have illustrated diagrammatically an apparatus suitable for carrying out my process.

I shall describe a process for the production of formaldehyde from methane such as natural gases although my process is not limited thereto and applies to all hydrocarbons and the production of the corresponding alcohol aldehydes and higher oxidation products.

Referring to the drawing, 1 indicates a closed container adapted to contain nitric acid. Air is admitted into the container near the bottom thereof by means of a pipe 2 provided with a control valve 3. The air charged with nitric acid fumes passes from the container 1 through a pipe 4 to an air conduit 5 likewise provided with a control valve 6. 5′ is a blower forcing air under pressure through the air conduit 5. A pipe 7 supplies under pressure methane or a gas containing methane and joins the pipe 5 at 8. There is a valve 9 in the pipe 7 and a valve 10 in the pipe 5 just before their joinder at 8 whereby the supply of methane and the mixture of air and nitric acid fumes, respectively, may be controlled. 10′ is a mixing and preheating chamber into which the methane, air and nitric acid fumes enter. 11 is a burner for heating the mixing and preheating chamber 10′. The mixture of gases passes from the preheating chamber 10′ into the reaction chamber 11′ where the methane is oxidized to methyl alcohol formaldehyde and higher oxidation products such as formic acid. 12 is a burner for heating the reaction chamber 11′. The gases pass from the reaction chamber 11′ through a condenser 15 of any suitable construction. 16 is a container for collecting the condensed formaldehyde and other oxidation products. The uncondensible gases are led from the collector 16 through a pipe 17 and through a washer and scrubber 18 of any suitable construction, in which traces of formaldehyde and other products are absorbed by water and the like, which is caused to circulate through the washer and scrubber 18 by means of a pipe 19 in which a suitable pump 20 is located. From the washer and the scrubber the catalyzing gases are led to the air pipe 2. 21 is a blower for forcing the air or tail gases through the nitric acid containers.

In carrying out the process the air and methane admitted to the mixing and preheating chamber 10′ are supplied in the proportion of one volume of methane to five volumes of air. The nitrogen oxids mix with the air and constitute from one to two per cent. by weight of the mixture of air and methane. The mixed gases are heated to approximately 200° C. and pass through the reaction chamber 11′ where they are subjected to a temperature of from 250° to 560° C. To facilitate the uniform heating of the gases it may be advisable to fill the reaction chamber with broken pieces of fire clay or the like.

The reactions taking place in the chamber 11′ are complicated. The nitrogen oxids act as carriers of oxygen to oxidize the methane to formaldehyde. Methane and oxygen form methyl alcohol formaldehyde and water.

The reaction in the chamber 11′ takes place exceedingly rapidly, eight seconds being sufficient for the passage of the gases therethrough, and in which practically all the methane is converted into methyl alcohol formaldehyde and other oxidation products the quantities of formic acid and methyl alcohol, the latter being about one per cent. each of the formaldehyde formed. The gases leaving the condenser are subjected to the washing and scrubbing operation in the scrubber 18 in which uncondensed portions of the reaction products are removed. The tail gases leaving the scrubber 18 and containing nitrogen oxid gases may be used again in the cycle of operation until they become so diluted with nitrogen, in case air and not oxygen is used in this process, that they must be discarded.

It may be desirable to make a mixture of alcohol aldehydes and other oxidation products from natural gases containing not only methane but other hydrocarbons, or other hydrocarbons alone, or mixed, may be used. There is a ready market for a mixture of aldehydes, which for many purposes, is as good as formaldehyde.

I have described the use of nitrogen oxids as the catalyzing agent in my process. However, other gaseous oxids, or oxygen acid, or oxids which will volatilize at the temperature of the reaction chamber may be used, such as the oxids of sulfur; carbon dioxid may also be used, and in place of air oxygen may be used.

It has been known for some time that when a mixture of air and natural gas or methane is passed through a tube or chamber heated to redness a small amount of formaldehyde is produced. I have also found this to be true. Now when a small amount of the oxids of nitrogen such as 1% to 2% are mixed with the mixture of air and methane or natural gas speed of the reaction which causes the formation of formaldehyde is greatly increased when passed through a heated chamber. The oxids of nitrogen are not reduced but come out of the reaction chamber in the same amount and kind as they went into the chamber showing that said oxids have not been altered and therefore act as catalyzers for a reaction which already exists. As further evidence of this, all the methane reacts with the air to form oxidation products very rapidly which would not be the case if the small amount of oxids acted as an oxidizing agent. I have also found that if the amount of oxids of nitrogen is increased much over 1% to 2% of the total gaseous mixture they become a serious detriment to the formation and recovery of methyl alcohol, formaldehyde and formic acid.

It should be noted that my process uses only a very small quantity, preferably only one to two per cent. of the nitrogen oxid as compared with the weight of the mixture of air and hydrocarbon that is used as a base for the production of alcohols, aldehydes, and other oxidation products. The nitrogen oxid serves as a catalyzer or a carrier of oxygen to effect the oxidation of the hydrocarbon.

The proportion of methane, air and the catalyzing agent may be widely varied with good results, although the proportions given in connection with methane, air and nitric acid fumes are preferred.

Various changes in the steps of my process may be made by those skilled in the art without departing from the spirit of my invention as claimed.

I claim:

1. A process of converting hydrocarbons into alcohols aldehydes and other oxidation products, comprising mixing hydrocarbon, oxygen and a gaseous catalyzer containing oxygen, said catalyzer being used in quantities substantially less than the quantity of hydrocarbon, heating the mixture, and separating the alcohol aldehydes and other oxidation products from the mixture.

2. A process of converting hydrocarbons into aldehydes, comprising mixing hydrocarbon, oxygen and a gaseous catalyzer consisting of nitrogen oxids, the nitrogen oxids being used in relatively small quantities as compared with the quantity of hydrocarbon, heating the mixture, and separating the aldehydes from the mixture.

3. A process of converting methane into formaldehyde, comprising mixing methane, oxygen, and a relatively small quantity of a gaseous catalyzer consisting of nitrogen oxid, heating the mixture and separating the formaldehyde formed from the mixture.

4. A process of converting methane into formaldehyde, comprising mixing methane, air, and a relatively small quantity of a gaseous catalyzer consisting of nitrogen oxid, heating the mixture to a temperature exceeding 500° C., and separating the formaldehyde formed from the mixture.

5. A process of converting hydrocarbons into aldehydes and other oxidation products, comprising mixing hydrocarbon and air, and a gaseous catalyzer, the quantity of the gaseous catalyzer being relatively small as compared with the quantity of the mixture of hydrocarbon and air, heating the mixture and separating the aldehydes and other oxidation products from the mixture.

6. A process of converting methane into formaldehyde, comprising mixing methane, air and nitrogen oxid, the nitrogen oxid being from one per cent. to two per cent. by weight of the mixture of air and methane, heating the mixture and separating the formaldehyde formed from the mixture.

In testimony whereof I have signed my name to this specification.

CARLISLE H. BIBB.